Sept. 11, 1934.         A. ANDERSSON         1,972,859
ROUGHENING MACHINE
Original Filed Jan. 2, 1929
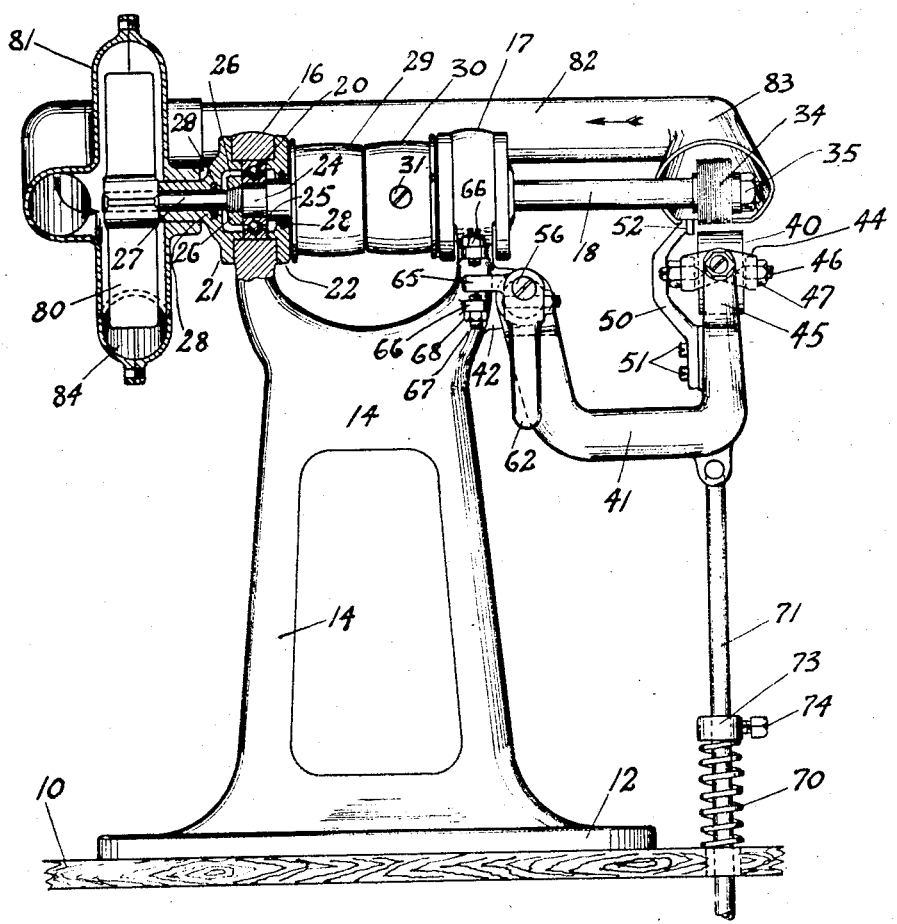
Fig. 1.
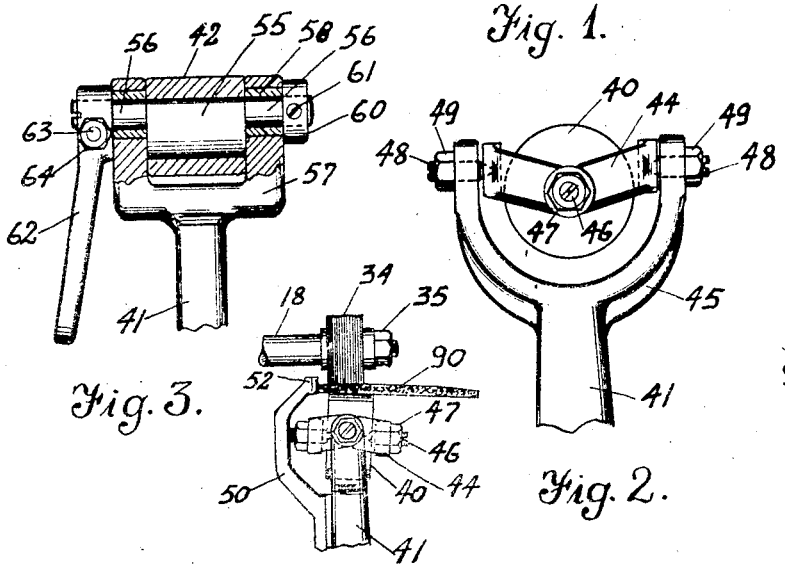
Fig. 3.
Fig. 5.
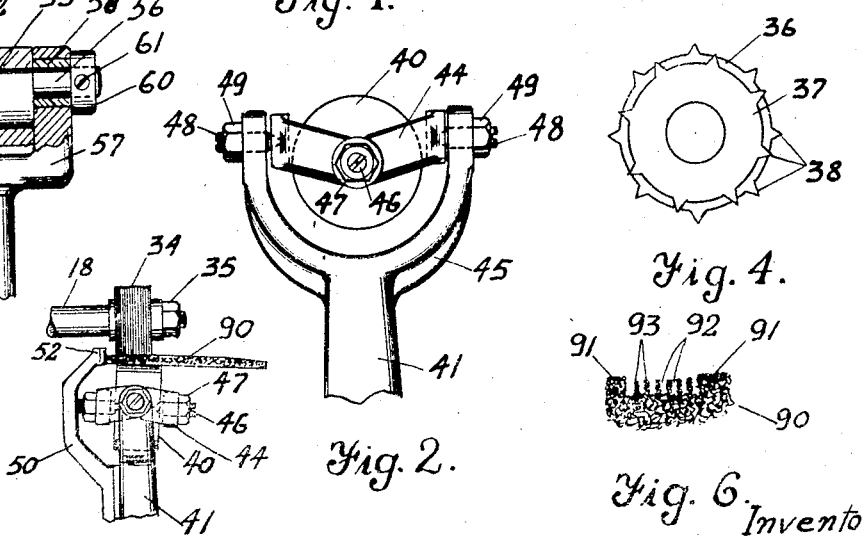
Fig. 2.
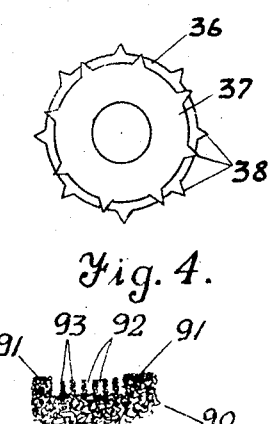
Fig. 4.
Fig. 6.
Inventor
Arvid Andersson
By Francis J. V. Dakin Atty Patented Sept. 11, 1934

1,972,859

UNITED STATES PATENT OFFICE 1,972,859

ROUGHENING MACHINE

Arvid Andersson, Boston, Mass., assignor to Peerless Machinery Company, Boston, Mass., a corporation of Massachusetts Application January 2, 1929, Serial No. 329,726
Renewed June 29, 1933

22 Claims. (Cl. 69—1)

This invention relates to a machine for roughening the surface of leather and similar material in preparation for the application thereto of a cement, and although designed with special reference to the cementing of soles to shoe uppers in the manufacture of shoes, it is susceptible to various other uses.

The principal object of this invention is the production of a machine adapted for roughening the surface of leather and similar material in such manner that a cement applied thereto will permeate the fibrous body of the material and will firmly anchor itself therein in order to secure a strong and permanent adhesion between two or more parts cemented together.

Another object of the invention is the production of a machine which is simple in construction and rapid and efficient in operation.

Other objects of the invention will be more specifically set forth and described in detail hereinafter.

My invention contemplates a machine having a rotary roughening member adapted for removing the surface of the leather or other work to expose the fibrous body of the same for the application of the cement thereto. Preferably, at the same time a series of parallel channels are formed by the roughening member to afford anchorage for the cement by facilitating the permeation of the body of the leather thereby.

One feature of my invention contemplates a work support which is backed up by spring pressure means in order to hold the work against the roughening member, and to take care of work of varying thickness, the work support is mounted for tilting movement so that it assumes automatically the position of engaging the work irrespective of its varying thickness. This is of importance when work having bevelled or skived edges is presented to the machine in order to force the work against the entire width of the roughening member.

Another feature of the invention resides in providing means for changing the position of the edge gage during the operation of the machine without interfering therewith in order to vary the distance between the edge of the work and the roughened area. In roughening soles, for instance, this distance is less at the shank than around the forepart and to prevent slowing down the operation, means are provided whereby the operator can change this distance at will.

Yet a further feature of the invention is the provision of a blower device operated from the main shaft of the machine for removing, through a conduit, the waste material thrown off by the roughening member, thereby preventing the accumulation of dust either on the work which would interfere with the cementing process or on the machine.

In the accompanying drawing illustrating one form of the invention, Figure 1 is a side elevation, partly in section, of a machine constructed and adapted to be operated in accordance with my invention; Fig. 2 is a front elevation of the work supporting roll and supporting mechanism therefor looking from right to left in Fig. 1; Fig. 3 is an elevation, partly in section, looking from right to left in Fig. 1 of the eccentric pivotal bearing of the supporting arm; Fig. 4 is an end elevation of the roughening member; Fig. 5 is a detail side elevation of the roughening member and work support with a sole shown in cross section interposed between to illustrate the tilted position of the work support when engaging work of varying thickness, and Fig. 6 is a cross sectional view of a portion of a sole showing the condition of the sole after it has been operated upon by the machine.

Referring to the drawing illustrating the preferred form of the invention, there is shown a frame adapted to be mounted on a bench or table 10 and comprising a base 12 and a skeleton standard 14, the upper portion of which is U-shaped, the two arms 16 and 17 of which carry the main shaft and operating mechanism of the machine. The frame may, however, be of any suitable form.

The main shaft 18 of the machine is rotatably mounted in ball bearings 20 arranged in suitable circular openings in the two arms 16 and 17 of the frame, the outer ring of each ball bearing being held in fixed position between two caps 21 and 22 and the inner ring fitting a reduced portion 24 of the main shaft and being locked thereon against a shoulder 25 thereof by a collar 26 threaded on a smaller portion 27 of the said shaft. Felt washers 28 mounted in the caps and bearing on the main shaft 18 and the reduced portion 27 prevent leakage of the ball bearing lubricant. Between the arms 16 and 17 and on the main shaft are two belt pulleys 29 and 30, the former being an idler and the latter being fastened to the shaft by a screw 31 for driving said shaft from any suitable source of power.

For roughening the work to remove its smooth surface and to open up its fibrous body for receiving cement, any suitable tool may be provided. The form thereof here shown, comprises a roughening roll 34 secured to the operating end of the main shaft 18 by a set nut 35. The roll is made up of a plurality of disks 36 and 37, each having a plurality of radial projecting points 38 arranged at intervals around its periphery for cutting a channel in the work. The disks may be of various diameters to cut channels of different depths but the member 34 as shown is built up of two sizes of disks in alternate arrangement (Fig. 4); the disks 36 of larger diameter being adapted for cutting comparatively deep channels into the fibrous body of the work and the disks 37 for scraping off the smooth surface of the work between the channels. The sizes and arrangements of the disks may be varied to a large extent, however, to secure different results, or to suit various kinds of work.

For supporting the work, an idler roll 40 is carried by an arm 41 pivotally mounted on a bracket 42 at the base of the upright arm 17. In order that the roll may automatically adjust itself to the shape of the work to support every part thereof and to hold it against the roughening member along a line parallel with the main shaft, the roll is axially mounted for rotation in a frame 44 which in turn is pivotally mounted in the bifurcated end 45 of the arm 41. Cone bearings 46 threaded through opposite sides of the frame 44 and held in adjusted position by set nuts 47 support the roll for rotation on its axis and two similar cone bearings 48 threaded through the two bifurcations of the end 45 of the arm 41 and held in adjusted position by set nuts 49 support the frame for oscillation on an axis transverse to the axis of the roll 40. It may be noted that the axis defined by the bearings 48 is above the center of gravity of the frame 44 and of the work rest 40 mounted therein, so that the upper element of the work rest which contacts with the work is normally kept horizontal and substantially parallel to the axis of the tool 34 by the action of gravity.

By this arrangement, the work support is capable of a tilting movement in the plane of its axis so that its upper element or work-engaging surface may assume a position inclined to the horizontal plane of the axis of the tool which is especially necessary and desirable when the work inserted in the machine is wedge-shaped in section parallel to the main shaft. In roughening soles, for instance, the edges of the soles are skived in the shank and therefore wedge-shaped, and to keep the entire surface of the sole to be roughened in contact with the roughening member it is necessary that the roll tilt laterally into an angular rather than parallel relation to said member when said portions are reached.

For guiding the work in the machine, any suitable form of work gage may be employed and one such is shown comprising a curved arm 50 secured to the upright end of the arm 41 by screws 51 and having a work engaging portion 52 in register with the top surface of the work supporting roll 40.

To permit of a limited adjustment of the gage 50 in relation to the roughening roll while the machine is in operation and without interfering with said operation the arm 41 is eccentrically mounted at its pivotal point. In some kinds of work, such as soles, the spacing between the roughened portion on the sole and the edge of the sole is narrower at the shank than around the forepart of the sole so that it is desirable in doing this work that the gage be changed while the sole is being fed through the machine. To accomplish this result, an eccentric stud 55 is rotatably mounted in the bracket 42 and upon the eccentric portions 56 thereof is mounted the bifurcated end 57 of the arm 41. To permit of assembly, the two bifurcations of the arm 41 are provided with bores of the same diameter as the main portion 55 of the eccentric stud and bushings 58 are inserted to reduce the diameter of each bore to that of the extensions 56. By removing the bushings and dropping the bifurcated end of the arm, the parts may be disassembled by withdrawing the eccentric stud through the bore of one of the bifurcated members and to assemble the bearing the operation is reversed and the bushings are inserted last. To prevent undue looseness between the bracket and the bifurcated end of the arm 41, a collar 60 may be mounted on the end of one of the portions 56 and secured thereto in adjusted position by a set screw 61.

To turn the eccentric stud in the bracket 42 for moving the arm 41 to the right or left as viewed in Fig. 1, a hand lever 62 is fastened to one of the eccentric portions 56 of the stud by means of a pin 63 and nut 64. The pin is mounted in a transverse bore in the head of the lever and is slightly cut out midway to fit the portion 56 (Fig. 1), and the tightening of the nut 64 on the threaded outer end of the pin draws it outwardly and thereby binds and locks the lever on the eccentric portion 56. By turning the hand lever, the operator is enabled to turn the stud 55 in the bracket and thereby to move the arm 41 to regulate the distance between the gage and the roughening member, and this can be done at any time without interfering with the operation of the machine.

To secure rapidly accurate placing of the roughened area on the forepart and the shank of a sole, the hand lever may be provided with a lateral extension 65 for engaging stops to limit its movement. Threaded in lugs 66, the two screw stops 67 are held in adjusted position by set nuts 68. When the hand lever is turned to bring the extension 65 in engagement with the lower stop, the arm 41 is moved to the left, and when the extension engages the upper stop the arm is at the extreme right. The former adjustment gives the correct margin for the forepart of a sole and the latter for the shank portion. In the operation of the machine the margin can be instantly changed by throwing the hand lever in one direction or the other as the case may be.

Normally the arm 41 is held in operative position with the work supporting roll close to the roughening member but not in actual contact with it by a helical spring 70 mounted on a treadle-rod 71 and abutting at its lower end the bench or table 10 and at its upper end a collar 73 held in adjusted position on said rod by a set screw 74. The treadle-rod is pivotally connected at its upper end to the arm 41 and at its lower end to a treadle not shown.

To remove the particles of leather and dust thrown off by the roughening member so as to keep the work and the machine clean, a suction blower device is incorporated in the machine and operated from the main shaft. In the form shown, a suction fan 80 is fixed on the reduced end 27 of the main shaft and operates in a casing 81 mounted on the cap 21. A conduit 82, having an open flaring mouth 83 in close proximity to the roughening member so as to receive the waste material, leads to the casing 81 which has an exhaust outlet 84 which may be connected to any suitable waste receptacle.

In the operation of the machine, the operator stands at the right hand side of the machine as shown in Figure 1, depresses the work support by a treadle (not shown) thereby pulling down the arm 41, then places the work on the work supporting roll and against the gage and releases the treadle to permit the work to be forced upwardly by the spring against the roughening roll and to be held in that position during the roughening process. When the work is pressed flat against the roughening roll, the work supporting roll engages across its entire periphery the lower face of the work and if that face is oblique to the upper face of the work, the work-supporting roll will tilt in the vertical plane of its axis to correspond. This is an important feature because otherwise wedge-shaped work could not be properly roughened. This action of the work roll is illustrated in Figure 5 in which the roll is shown slightly tilted in consequence of the skived edge of the sole 90 presented to the roughening roll. The latter member removes the outer surface of that portion of the sole 90 in contact with it and cuts a plurality of parallel channels 92 into the fibrous body of the leather. The top edges 93 of the parallel partitions between the channels and the walls of the channels are therefore left in a condition suitable for receiving and absorbing cement and for forming an anchorage ground therefor.

In roughening soles, the roughened area starts from the heel portion along one side of the shank, around the forepart and along the other side of the shank of the sole. The margin between the roughened area and the edge of the sole is less at the shank portion than around the forepart and the width of this margin is adjusted by the operator by manipulating the hand lever 62, at the appropriate times, without interfering with the feeding of the work or the operation of the machine. During these operations all of the waste material thrown off by the roughening member is drawn into the suction conduit of the blower mechanism and the work, machine and surrounding space are maintained clean and free of dust.

The machine of my invention has the advantages of being simple in construction, easy to operate, clean and efficient and rapid in performance. By substituting various forms of roughening members, it may be adapted to a large variety of work.

It is to be understood that my invention is not to be limited to the precise form herein shown and described since it is capable of other embodiments within the scope of the following claims.

What I claim is:

1. A machine of the character described having, in combination, a rotary member for roughening the surface of the work and a spring-pressed work-supporting roll for holding the work against said rotary member, said roll being so mounted as to permit its axis to be oscillated.

2. A machine of the character described having, in combination, a rotary member for roughening the surface of the work, a spring-pressed roll for holding the work against said rotary member, and means for supporting said roll arranged to permit the axis of the roll to be oscillated to engage work of varying thickness.

3. A machine of the character described having, in combination, a rotary roughening member, a pivotally mounted arm, a work-supporting roll carried by said arm, the axis of said roll being mounted for oscillation to take care of work of varying thickness, and a spring for forcing said roll toward said roughening member to hold the work thereagainst.

4. A machine of the character described having, in combination, a main shaft, a roughening member fixed to one end of said shaft, a pivotally mounted work-supporting arm, said pivotal mounting of said arm being eccentric to permit adjustment of said arm in relation to said roughening member, a rotatable work support carried by said arm, the axis of said work-support being mounted for oscillation to take care of work of varying thickness, treadle operated means for depressing said arm to permit insertion of the work, and a spring acting on said arm for holding the work against the roughening member.

5. A machine of the character described comprising a main shaft, a rotary roughening member made up of a plurality of disks having peripheral cutting points mounted on one end of said main shaft, a blower mechanism mounted on the other end of said main shaft, a conduit extending from said roughening member to said blower mechanism for removing by suction the waste material thrown off in the roughening operation, a rotatable work support, means for supporting said work-support arranged to permit the axis of the work-support to be oscillated to engage work of varying thickness, treadle operated means for depressing said work-support to permit insertion of the work, and a spring for forcing said work support upwardly to hold the work against the roughening member.

6. A machine of the character described having, in combination, a frame, a main shaft mounted in said frame, a rotary roughening member mounted on one end of said shaft, an eccentric bearing in said frame, a U-shaped arm pivotally mounted on said eccentric bearing, means for adjusting said bearing to vary the relation of said arm to said roughening member, a work support carried by said arm and having its axis mounted for oscillating movement, treadle operated means for depressing said arm to permit insertion of the work, and a spring for forcing said arm upwardly to hold the work against the roughening member.

7. A machine of the character described having, in combination, a rotary member for roughening the surface of the work, a work-supporting arm mounted on a movable pivot for pivotal movement in a vertical plane, and means for moving said pivot to adjust said arm in a direction transversely of said roughening member.

8. A machine of the character described having, in combination, a member for roughening the work, a U-shaped work-supporting arm mounted on a movable pivot for pivotal movement in a vertical plane, and means operable without interfering with the operation of the machine, for moving said pivot to move said arm in a direction transversely of said roughening member.

9. A machine of the character described having, in combination, a member for roughening the surface of the work, a work-supporting arm pivotally mounted on an eccentric stud for pivotal movement in a vertical plane, a gage carried by said arm, and means for turning said stud to vary the positions of said arm and said gage in relation to said roughening member.

10. A machine of the character described having, in combination, means for roughening the surface of the work, a work-supporting arm mounted on a movable pivot for pivotal movement in a vertical plane, a gage carried by said arm, and means for moving the pivot point of said arm to vary the position of said gage in relation to said roughening means.

11. A machine of the character described having, in combination, a rotary member for roughening the surface of the work, a work-supporting arm mounted on a movable pivot for pivotal movement in a vertical plane, a gage carried by said arm, and means for moving said pivot in order to adjust said arm and said gage in relation to said rotary member, said pivot moving means being capable of operation without interfering with the operation of the machine.

12. A machine of the character described having, in combination, a rotary member for roughening the surface of the work, a U-shaped work-supporting arm, a gage mounted on the end of said arm, said arm being so mounted as to permit movement thereof in a vertical plane and in a direction parallel to the axis of said rotary member for adjusting the work in relation to said member, and means for moving said arm during the operation of the machine without interfering therewith.

13. A machine of the character described having, in combination, a rotary member for roughening the surface of the work, an arm having its end turned upwardly, said arm being pivotally and eccentrically mounted on a stud, a work support mounted on the end of said arm for tilting movement for holding work of irregular thickness against said rotary member, a gage carried by said arm, and means for turning said eccentric stud to vary the relation between said gage and said roughening member.

14. A machine of the character described having, in combination, means for roughening the surface of the work, a work-supporting arm mounted on a movable pivot for pivotal movement in a vertical plane, means for moving the pivot point of said arm without interfering with the operation of the machine to vary the position of said work-supporting arm in relation to said roughening means, a spring for forcing the said work supporting arm toward said roughening means, and treadle operated means for depressing said arm against said spring to permit the insertion of work.

15. A machine of the character described having, in combination, a rotary roughening member, a pivotally mounted arm having its free end in the form of a yoke, a frame carried by said yoke and a work supporting member mounted in said frame, said frame being mounted in said yoke for oscillation in a vertical path to take care of work of varying thickness.

16. A machine of the character described having, in combination, a rotary roughening member, a pivotally mounted spring pressed arm having its free end in the form of a yoke, a frame mounted in said yoke, a work supporting member carried by said frame, said frame being mounted in said yoke for oscillation in a vertical path to take care of work of varying thickness and a treadle for depressing said arm against said spring to permit insertion of work.

17. A machine of the character described having, in combination, a rotary roughening tool for roughening the surface of the work, a work rest having a work-engaging surface normally substantially parallel to the axis of the tool, and means supporting said work rest for free tilting movement in response to the interposition of work of non-uniform thickness between it and the periphery of the tool.

18. A machine of the character described having, in combination, a rotary roughening tool for roughening the surface of the work, a work rest having a normally horizontal work-engaging surface, and means suspending said work rest for oscillation about an axis above its center of gravity, said work rest being freely tiltable about said axis in response to the interposition of a beveled piece of work between it and the periphery of the tool.

19. A machine of the character described having, in combination, a rotary roughening tool for roughening the surface of the work, a work rest bodily movable toward and from the periphery of the tool, resilient means urging the work rest toward the tool, means operative to move the rest away from the tool, and means supporting the work rest to tilt freely about an axis in a plane substantially perpendicular to the axis of the tool, and means for adjusting the work-engaging surface of the rest so that it occupies a predetermined relation to the axis of the tool.

20. A machine of the character described having, in combination, a rotary roughening tool for roughening the surface of the work, a work rest, a gage, common means supporting the rest and gage, said supporting means being movable between predetermined limits, said supporting means comprising a tilting frame in which the work rest is mounted, said frame being suspended above its center of gravity and freely tiltable in response to the character of work interposed between it and the tool.

21. A machine of the character described having, in combination, a rotary roughening tool for roughening the surface of the work, a work rest, a gage, an arm forming a common support for the rest and gage, means operative to move the arm bodily, thereby to shift the gage in a direction substantially parallel to the axis of the tool, and means for moving the arm so as to carry the work rest toward and from the tool.

22. A machine of the character described having, in combination, a rotary roughening tool for roughening the surface of the work, a work rest, a gage, an arm forming a common support for the rest and gage, an eccentric mounting for one end of the arm, means for actuating said eccentric mounting, thereby to move the arm bodily to shift the gage axially of the tool, and means operative to swing the arm about said eccentric mounting, thereby to move the work rest toward and from the tool, said arm comprising a pivoted frame in which the work rest is suspended for tilting movement.

ARVID ANDERSSON.